(12) United States Patent
Petrocelli et al.

(10) Patent No.: US 8,282,901 B2
(45) Date of Patent: Oct. 9, 2012

(54) INTEGRATION OF CATALYTIC $CO_2$ OXIDATION AND OXYFUEL SOUR COMPRESSION

(75) Inventors: Francis Peter Petrocelli, Allentown, PA (US); Kevin Boyle Fogash, Wescosville, PA (US); Vincent White, Ashtead (GB)

(73) Assignee: Air Products and Chemicals, Inc., Allentown, PA (US)

( * ) Notice: Subject to any disclaimer, the term of this patent is extended or adjusted under 35 U.S.C. 154(b) by 35 days.

(21) Appl. No.: 12/832,096

(22) Filed: Jul. 8, 2010

(65) Prior Publication Data

US 2012/0009106 A1 Jan. 12, 2012

(51) Int. Cl.
*B01D 53/52* (2006.01)
*B01D 53/34* (2006.01)
*C01B 53/56* (2006.01)
*C01B 21/00* (2006.01)

(52) U.S. Cl. ............... 423/242.1; 423/437.1; 423/235; 423/393; 60/72; 60/780

(58) Field of Classification Search .................. None
See application file for complete search history.

(56) References Cited

U.S. PATENT DOCUMENTS

| | | | |
|---|---|---|---|
| 4,781,902 A | | 11/1988 | Schoubye |
| 7,416,716 B2 * | | 8/2008 | Allam et al. ............... 423/437.1 |
| 7,662,351 B2 * | | 2/2010 | Hirsch et al. ................ 423/111 |
| 2003/0037550 A1 * | | 2/2003 | Fassbender ..................... 60/772 |
| 2004/0071621 A1 | | 4/2004 | Tatsuhara et al. |
| 2008/0173584 A1 | | 7/2008 | White et al. |
| 2008/0173585 A1 | | 7/2008 | White et al. |
| 2008/0176174 A1 | | 7/2008 | White et al. |
| 2010/0322843 A1 * | | 12/2010 | Court et al. ................ 423/437.1 |
| 2011/0139046 A1 * | | 6/2011 | Fan et al. ..................... 110/204 |

FOREIGN PATENT DOCUMENTS

| | | |
|---|---|---|
| CA | 2 743 713 A1 | 7/2010 |
| EP | 1 440 725 A1 | 7/2004 |
| EP | 1 790 614 A1 | 5/2007 |
| EP | 1 816 103 A2 | 8/2007 |

(Continued)

OTHER PUBLICATIONS

Keilin, B, et al. "Development of the catalytic chamber process for the manufacture of sulphuric acid and Nitric acids from Waste Flue gases". Typco Laboratories, Inc. Waltham, MA (1969).*

(Continued)

*Primary Examiner* — Melvin C Mayes
*Assistant Examiner* — Sheng H Davis
(74) *Attorney, Agent, or Firm* — Willard Jones, II (57) ABSTRACT

Sulfur dioxide ($SO_2$) may be removed from carbon dioxide feed gas by contacting the carbon dioxide at an elevated temperature and an elevated pressure with a catalyst for oxidizing $SO_2$, in the presence of oxygen ($O_2$) to convert $SO_2$ to sulfur trioxide ($SO_3$); contacting $SO_3$ in the resultant $SO_3$-enriched carbon dioxide gas with water to produce sulfuric acid and $SO_2$-depleted carbon dioxide gas; and separating the sulfuric acid from the $SO_2$-depleted carbon dioxide gas. If present, $NO_x$ is also removed from the carbon dioxide feed gas as nitric acid to produce $SO_2$-depleted, $NO_x$-lean carbon dioxide gas. The method has particular application in the removal of $SO_2$ and $NO_x$ from flue gas produced by oxyfuel combustion of a hydrocarbon fuel or carbonaceous fuel, within or downstream of the $CO_2$ compression train of a $CO_2$ recovery and purification system.

19 Claims, 3 Drawing Sheets

FOREIGN PATENT DOCUMENTS

| | | |
|---|---|---|
| WO | 2010/036668 | 4/2010 |
| WO | 2010/075917 A1 | 7/2010 |

OTHER PUBLICATIONS

Wilkinson, et al; "Oxyfuel Conversion of Heaters and Boilers for CO2 Capture;" Second National Conference on Carbon Sequestration; Washington DC; May 5-8, 2003.

Dillon, et at; "Oxy-Combustion Processes for CO2 Capture from Advanced Supercritical PF and NGCC Power Plant;" presented at GHGT-7 Vancouver, Sep. 2004.

Jordal; et al; "Oxyfuel Combustion for Coal-Fired Power Generation with CO2 Capture-Opportunities and Challenges;" GHGT-7 Vancouver, 2004.

Counce, R. M.; "A Literature Review of Nitrogen Oxide Absorption Into Water and Dilute Nitric Acid;" sponsored by an agency of the US Govenment. Aug. 1977.

Zarenezhad, Bahman; "New Correlation Predicts Dewpoints of Acidic Combustion Gases." Oil and Gas Journal; vol. 108, Issue 7; Feb. 22, 2010.

Petrocelli, et al; U.S. Appl. No. 12/832,204, filed Jul. 8, 2010; "Sorbent Use with Oxyfuel Sour Compression."

White et al; U.S. Appl. No. 12/832,095, filed Jul. 8, 2010; "Handling of Acids from Compressed Oxyfuel-Derived CO2."

Wright et al; U.S. Appl. No. 12/832,156, filed Jul. 8, 2010; "Treatment of Flue Gas From an Oxyfuel Combustion Process".

Wright, et al; U.S. Appl. No. 12/832,117, filed Jul. 8, 2010; "Recycle TSA Regen Gas to Boiler for Oxyfuel Operations."

Diamond, Barry Wayne; U.S. Appl. No. 12/832,120; "Removal of Acid Mists".

Laursen et al; "Meeting Industry Demands" WSA Process; Haldor Topsoe SOX process; Sulphur 312 (2007); p. 80-85.

White, V., et al.; "Purification of Oxyfuel-Derived CO2"; International Journal of Greenhouse Gas Control; vol. 4; 2010; pp. 137-142.

* cited by examiner

INTEGRATION OF CATALYTIC $CO_2$ OXIDATION AND OXYFUEL SOUR COMPRESSION

BACKGROUND OF THE INVENTION

The present invention relates generally to a method for purifying carbon dioxide gas. In particular, the present invention relates to a method for removing sulfur dioxide ($SO_2$) from carbon dioxide gas comprising $SO_2$ as a contaminant. The method also removes $NO_x$, if present as a further contaminant, from the carbon dioxide gas. The invention has particular application in the purification of crude carbon dioxide, e.g. flue gas from an oxyfuel combustion process in a pulverized coal fired power station in which sulfur containing carbonaceous or hydrocarbon fuel is combusted in a boiler to produce steam for electric power generation.

The term "$SO_x$" means oxides of sulfur and includes $SO_2$ and sulfur trioxide ($SO_3$). The term "$NO_x$," means oxides of nitrogen and includes primarily nitric oxide (NO) and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapour by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverised coal-fired power boiler is described in a paper entitled "*Oxy-combustion processes for $CO_2$ capture from advanced supercritical PF and NGCC power plants*" (Dillon et al; presented at GHGT-7, Vancouver, September 2004), the disclosure of which is incorporated herein by reference.

Oxyfuel combustion produces raw flue gas containing primarily $CO_2$, together with contaminants such as water vapour; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), $NO_x$ and $NO_2$ produced as oxidation products from components in the fuel or by combination of $N_2$ and $O_2$ at high temperature. The precise concentrations of the gaseous impurities present in the flue gas depend on factors such as on the fuel composition; the level of $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardise the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapour; $SO_x$; $NO_x$; soluble gaseous impurities such as HCl; and "non-condensable" gases such as $O_2$, $N_2$ and Ar, in order to produce a final $CO_2$ product which will be suitable for storage or use.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulfurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x/NO_x$ removal using desulfurization and $NO_x$ reduction technologies is disclosed in "*Oxyfuel Combustion For Coal-Fired Power Generation With $CO_2$ Capture—Opportunities And Challenges*" (Jordal et al; GHGT-7, Vancouver, 2004). Such process could be applied to conventional coal boilers.

U.S. Pat. No. 4,781,902 discloses a process in which $SO_2$ and $NO_x$ may be removed from flue gas from combustion processes by a Selective Catalytic Reduction ("SCR") of $NO_x$ to $N_2$ ("$deNO_x$") using ammonia, followed by an oxidation of $SO_2$ to $SO_3$ using vanadium pentoxide-based catalysts. Water vapour reacts with $SO_3$ and is then condensed within a Wet gas Sulfuric Acid (WSA) condenser to produce an aqueous solution of sulphuric acid. The $deNO_x$ and $SO_2$-oxidation reactions take place at elevated temperature, typically about 400° C., and at about atmospheric pressure. 90-95% $SO_2$ conversion using this process has been calculated to require a volumetric hourly space velocity in the $SO_2$ oxidation reactor of about 2500 $Nm^3_{feed}/h/m^3_{catalyst\ bed}$. The process has been developed by Haldor Topsøe A/S of Lyngby, Denmark and is known as the SNOX™ process.

US 2004/0071621 A1 discloses a process for the removal of $SO_2$ from flue gas generated in a combustion process. The flue gas is cooled and soot is removed from the cooled flue gas. The cooled soot-free flue gas is further cooled and $SO_2$ in the further cooled, soot-free, flue gas is oxidized to $SO_3$ in the presence of $O_2$ using a catalyst unit containing structured arrangements of at least one activated carbon fiber board, and is washed with water to produce a dilute (2~5%) aqueous solution of sulfuric acid. The washed gas is then discharged directly to the atmosphere via a mist eliminator (which is optional) and a smoke stack. It is disclosed that the pressure of the flue gas is elevated to cause the gas to pass through the catalyst unit.

US 2007/0122328 A1 (granted as U.S. Pat. No. 7,416,716 B1) discloses the first known method of removing $SO_2$ and $NO_x$ from crude carbon dioxide gas produced by oxyfuel combustion of a hydrocarbon or carbonaceous fuel, in which the removal steps take place in the $CO_2$ compression train of a $CO_2$ recovery and purification system. This process is known as a "sour compression" process since acid gases are compressed with carbon dioxide flue gas. The method comprises maintaining the crude carbon dioxide gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating said sulfuric acid and/or nitric acid from the crude carbon dioxide gas.

There is a continuing need to develop new methods for removing $SO_2$ and, where present, $NO_x$ from carbon dioxide gas, and particularly from crude carbon dioxide gas such as flue gas produced in an oxyfuel combustion process such as that involved in a pulverized coal-fired power boiler.

BRIEF SUMMARY OF THE INVENTION

It is an object of the present invention to develop a new method for removing $SO_2$ and, where present, $NO_x$ from carbon dioxide gas, particularly from flue gas from an oxyfuel combustion process.

It is an object of preferred embodiments of the present invention to reduce the size of, or even eliminate, (i) conventional FGD systems to remove $SO_2$, and/or (ii) conventional SCR systems to remove $NO_x$.

It is another object of preferred embodiments of the present invention to improve the methods disclosed in US 2007/0122328 A1 by (i) enabling a reduction in the size of the sour compression reactor system, and/or (ii) accelerating $SO_2$ (and NO) oxidation to $SO_3$ (and $NO_2$), and/or (iii) reducing the amount of (mixed) acid condensate that is produced and, therefore, would have to be processed and/or disposed of.

It is a further object of preferred embodiments of the present invention to reduce the catalyst requirement in conventional processes, e.g. the SNOX™ process by Haldor Topsøe A/S, for the removal of $SO_2$ from flue gas by oxidation to $SO_3$ and condensation with water to form aqueous sulfuric acid.

According to the first aspect of the present invention, there is provided a method for removing $SO_2$ from a carbon dioxide feed gas comprising $SO_2$ as a contaminant, said method comprising:
contacting said carbon dioxide feed gas at an elevated temperature and an elevated pressure with a catalyst for oxidizing $SO_2$, in the presence of $O_2$ to convert $SO_2$ to $SO_3$ and produce an $SO_3$-enriched carbon dioxide gas;
contacting $SO_3$ in said $SO_3$-enriched carbon dioxide gas with water to produce sulfuric acid and a $SO_2$-depleted carbon dioxide gas; and
separating said sulfuric acid from said $SO_2$-depleted carbon dioxide gas, or from an $SO_2$-depleted carbon dioxide gas derived therefrom.

The present method has particular application in removing $SO_2$ and $NO_x$ from flue gas generated by oxyfuel combustion of hydrocarbon fuel or carbonaceous fuel.

The present method substantially reduces the concentration of $SO_2$ and, where present, $NO_x$ in carbon dioxide gas such as flue gas. The method can be integrated with a conventional FGD and/or SCR system thereby significantly reducing the size of these systems. Indeed, the method can be used to replace such systems. The method can also be readily integrated with the method disclosed in US 2007/0122328 A1 thereby reducing of the size of the sour compression reactor system. Such embodiments have the added benefit of reducing the amount of $SO_2$-oxidation catalyst required as compared to the SNOX™ process, due to the dual mechanisms by which $SO_2$ is oxidized.

According to a second aspect of the present invention, there is provided apparatus for removing $SO_2$ from carbon dioxide feed gas comprising $SO_2$ as a contaminant, said apparatus comprising:
a compressor arrangement for elevating the pressure of said carbon dioxide feed gas comprising $SO_2$ as a contaminant;
a catalytic reactor system comprising a catalyst for oxidizing $SO_2$, said reactor system being suitable for contacting said carbon dioxide feed gas at an elevated temperature and an elevated pressure with said catalyst in the presence of $O_2$ to convert $SO_2$ to $SO_3$ and produce $SO_3$-enriched carbon dioxide gas;
a conduit arrangement for feeding carbon dioxide gas at said elevated pressure from the compressor arrangement to the catalytic reactor system;
a separator system for contacting $SO_3$ in said $SO_3$-enriched carbon dioxide gas with water to produce sulfuric acid and $SO_2$-depleted carbon dioxide gas, and for separating said sulfuric acid from said $SO_2$-depleted carbon dioxide gas, or from a $SO_2$-depleted carbon dioxide gas derived therefrom; and
a conduit arrangement for feeding $SO_3$-enriched carbon dioxide gas from the catalytic reactor system to the separator system.

DETAILED DESCRIPTION OF THE INVENTION

The method for removing $SO_2$ from a carbon dioxide feed gas comprising $SO_2$ as a contaminant comprises contacting the carbon dioxide feed gas at an elevated temperature and an elevated pressure with a catalyst for oxidizing $SO_2$, in the presence of $O_2$ to convert $SO_2$ to $SO_3$ and produce an $SO_3$-enriched carbon dioxide gas. $SO_3$ in the $SO_3$-enriched carbon dioxide gas is contacted with water to produce sulfuric acid and a $SO_2$-depleted carbon dioxide gas. Sulfuric acid is separated from $SO_2$-depleted carbon dioxide gas, or from an $SO_2$-depleted carbon dioxide gas derived therefrom.

The method is primarily intended as an alternative or improved method to that disclosed in US 2007/0122328 A1 for removing $SO_2$ and $NO_x$ from flue gas generated by oxyfuel combustion of a hydrocarbon or carbonaceous fuel, in or downstream of, a $CO_2$ compression train in a $CO_2$ recovery and purification system.

It should be noted that the percentages indicated for the various components in gas streams discussed below are approximate molar percentages (mol. %) calculated on a dry basis. In addition, all pressures provided below are absolute pressures and not gauge pressures.

The method is understood by the Inventors to involve the following reactions:

$$2SO_2 + O_2 \rightarrow 2SO_3 \qquad \text{(i)}$$

$$SO_3 + H_2O \rightarrow H_2SO_4 \qquad \text{(ii)}$$

The method typically removes over 80% of the $SO_2$ contaminant in the carbon dioxide feed gas and, in most embodiments, the method removes over 90% of the $SO_2$ contaminant in the feed gas. In some embodiments, the method removes substantially all (e.g. >95%) of the $SO_2$ contaminant in the carbon dioxide feed gas to produce a substantially $SO_x$-free carbon dioxide gas.

The method is suitable to purify carbon dioxide containing $SO_2$ as a contaminant from any source. However, in preferred embodiments, the carbon dioxide gas is, or is derived from, flue gas produced by combustion of a fuel selected from the group consisting of hydrocarbon fuels such as natural gas, and carbonaceous fuels such as coal. The method has particular application for removing $SO_2$ from flue gas produced by oxyfuel combustion of a sulfur-containing fuel, particularly coal.

Flue gas generated in an oxyfuel combustion process usually contains carbon dioxide as the major component, with $SO_x$, $NO_x$ and the non-condensable gases $O_2$, $N_2$, Ar, Kr and Xe. $SO_x$ is produced by the combustion of elemental sulfur and/or sulfur-containing compounds present in the fuel. $O_2$ is present in the flue gas from excess $O_2$ used in the combustion and from air ingress into the combustion unit which is also responsible for the presence of $N_2$, Ar, Kr and Xe in the flue gas. $NO_x$ is produced by reaction $N_2$ with $O_2$ in the combustion unit.

Further components in the flue gas include solid particulates such as fly ash and soot; water; CO; HCl; $CS_2$; $H_2S$; HCN; HF; volatile organic compounds (VOCs) such as $CHCl_3$; metals including mercury, arsenic, iron, nickel, tin, lead, cadmium, vanadium, molybdenum and selenium; and compounds of these metals.

Flue gas from the combustor is typically washed with water to remove particulates (such as soot and/or fly ash) and water soluble components (such as HF, HCl and/or $SO_3$). Additionally, the flue gas may be filtered, using equipment such as a baghouse or electrostatic precipitator, to enhance particulate removal. Since the flue gas is typically at atmospheric pressure, it is then compressed after washing to the elevated pressure to form the carbon dioxide feed gas to be purified by the method. However, if the feed gas originates from a source, such as a pressurized oxyfuel combustion system, that is already at the required elevated pressure, then compression is not required.

Where the carbon dioxide gas is produced in an oxyfuel combustion process, the method usually involves the combustion of the fuel in pure $O_2$ or an $O_2$-rich gas, e.g. a gas comprising at least 80% $O_2$, optionally with recycled flue gas from the combustion process to moderate the temperature of combustion and control heat flux.

The method may be used to remove $SO_2$ and, optionally, $NO_x$ from carbon dioxide feed gas having a flow rate from 200 kmol/h to 40,000 kmol/h which flow rates are typical for flue gas generated in an oxyfuel combustion process.

The method may be used to remove $SO_2$ from a stream of otherwise pure $CO_2$ gas. However, the method has particular application in removing $SO_2$ from "impure" carbon dioxide gas, e.g. carbon dioxide gas having from about 90% to about 95% $CO_2$, and more particularly in removing $SO_2$ from "crude" carbon dioxide gas, e.g. carbon dioxide feed gas having from about 40% to about 90% $CO_2$, such as flue gas from an oxyfuel combustion process. In preferred embodiments, the carbon dioxide feed gas has from about 60% to about 90% $CO_2$; and preferably from about 65% to about 85% $CO_2$.

The amount of $SO_2$ contaminant in the feed gas is usually more than 50 ppm. The amount of $SO_2$ contaminant in the feed gas is usually no more than about 10,000 ppm. The amount of $SO_2$ contaminant in the feed gas is typically from about 100 ppm to about 5,000 ppm.

$O_2$ may be added to the feed gas to provide the $O_2$ necessary to oxidize $SO_2$ to $SO_3$. However, in embodiments where the carbon dioxide feed gas is, or is derived from, flue gas from a combustion process, at least sufficient (and often excess) $O_2$ is usually present in the carbon dioxide feed gas such that additional $O_2$ from an external source is not typically required. In such embodiments, the amount of $O_2$ in the feed gas is usually from about 0.1% to about 15%, e.g. from about 1% to about 8%, of the feed gas.

The term "elevated pressure" is intended to mean a pressure that is significantly greater than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The elevated pressure is usually at least 2 bar (0.2 MPa), e.g. at least 3 bar (0.3 MPa), or at least 5 bar (0.5 MPa). The elevated pressure is usually no more than about 100 bar (10 MPa) and preferably no more than about 50 bar (5 MPa). The elevated pressure may be from about 3 bar to about 50 bar (0.3 MPa to 5 MPa), e.g. from about 5 bar to about 50 bar (0.5 MPa to 5 MPa), or from about 10 bar to about 40 bar (1 MPa to 4 MPa).

The term "elevated temperature" is intended to mean a temperature that is significantly greater than ambient temperature. The American Society of Testing and Materials (ASTM) defines ambient temperature as from 50° F. to 100° F., i.e. from about 10° C. to about 38° C.

The elevated temperature is typically at least 300° C. The elevated temperature is usually no more than about 700° C. The elevated temperature may be from 300° C. to about 700° C., e.g. from 300° C. to about 600° C. In some embodiments, the elevated temperature is from about 375° C. to about 475° C.

The $SO_3$ in the $SO_3$-enriched carbon dioxide gas is contacted with water at an elevated pressure. The elevated pressure of this contact step is usually the same as the elevated pressure of the catalytic oxidation step, subject to any inherent pressure drop within the method or apparatus. However, it is conceivable that there may be a desire to carry out the $SO_3$/water contact step at a "second" elevated pressure that is different from a "first" elevated pressure of the catalytic oxidation step. The second elevated pressure may be higher or lower than the first elevated pressure, but would within the preferred ranges for the elevated pressure. Suitable pressure adjustment arrangements may be used to increase or lower the elevated pressure as required, as is known in the art.

At preferred elevated temperatures, $SO_3$ will react with water vapor to produce sulfuric acid. Without wishing to be bound by any particular theory, the Inventors believe that, provided the elevated temperature is sufficiently high, this reaction takes place in the gas phase to produce either gaseous sulfuric acid or sulfuric acid in the form of an acid mist or aerosol, depending on the temperature. In some embodiments, sulfuric acid may be separated from $SO_2$-depleted carbon dioxide gas without first cooling the gas mixture to the point where the acid condenses. However, since the sulfuric acid in these embodiments is either gaseous or an aerosol, these embodiments may not be preferred.

In preferred embodiments, the method comprises cooling the $SO_3$-enriched carbon dioxide gas to a reduced temperature that is less than the elevated temperature and no more than the acid dew point at the elevated pressure, thereby condensing sulfuric acid as a liquid, usually in the form of an aqueous acid solution. The sulfuric acid may then be separated from the $SO_2$-depleted carbon dioxide gas, or from a $SO_2$-depleted carbon dioxide gas derived therefrom, using conventional methods for separating gas and liquid phases.

The "acid dew point" is a conventional term in the art referring to the temperature at which reaction conditions favor production of inorganic acid as a liquid, for example from the gas phase equilibrium reaction of $SO_3$ and water. The acid dew point is dependent on pressure and the concentration of other components such as $SO_3$ (and $NO_x$), and a higher pressure (or a higher concentration of the other component(s)) means a higher dew point. Table 1 provides some examples from the literature (Oil & Gas Journal; Vol. 108; Issue 7; 22 Feb. 2010) of how acid dew point varies with pressure, water and $SO_3$ concentrations.

TABLE 1

| Pressure bar (MPa) | Dew point (° C.) 5% $H_2O$; 5,000 ppm $SO_3$ | Dew point (° C.) 20% $H_2O$; 5,000 ppm $SO_3$ | Dew point (° C.) 5% $H_2O$; 10,000 ppm $SO_3$ |
|---|---|---|---|
| 1 (0.1) | 194 | 204 | 201 |
| 10 (1) | 233 | 242 | 240 |
| 30 (3) | 250 | 259 | 257 |

The reduced temperature is typically no more than 300° C. and is usually from ambient temperature to about 275° C. The reaction temperature may be more than ambient temperature, e.g. at least 40° C., and may be from about 40° C. to about 275° C. Preferred ranges for the reaction temperature may be from ambient temperature to 150° C., or from about 20° C. to about 100° C.

The $SO_3$-enriched carbon dioxide gas may be cooled by indirect heat exchange against at least one coolant. The coolant may be a liquid, e.g. water, or gaseous, e.g. air. In preferred embodiments, the gas may be cooled initially using a first coolant, and then further cooled using a second coolant. The first and second coolants may be the same or different. In a preferred embodiment, the gas is cooled initially by indirect heat exchange against water, and then further cooled by indirect heat exchange using air. An example of a suitable air-cooled heat exchanger is a shell-and-tube type acid condenser such as the WSA condenser used in the SNOX™ process.

All of the water vapor required to react with the $SO_3$ produced by the catalytic oxidation of $SO_2$, may be provided internally, e.g. having been produced in a combustion process and already being present as a further contaminant of the carbon dioxide feed gas, and/or added in a flue gas washing step. However, water from an external source may be added to the $SO_3$-enriched carbon dioxide gas, particularly at the start up of the method. Water may be added in vapor form but, in preferred embodiments, water is added as a liquid. If water is added from an external source, it usually helps to cool the gas, particularly where water is added as a liquid. Thus, the $SO_3$-enriched carbon dioxide gas may be cooled by direct heat exchange with water from an external source. Water added in this way helps ensure that no acid is carried downstream to corrode apparatus.

Where sulfuric acid is produced as an aqueous acid solution, the concentration of sulfuric acid in the aqueous acid solution will depend on the amount of water present in the carbon dioxide feed gas and/or the amount of water added from an external source. However, the aqueous acid solution typically comprises from 50 wt % to 99.9 wt sulfuric acid. Preferably, the aqueous acid solution comprises no less than 75 wt % and, more preferably, no less than 90 wt % sulfuric acid. In preferred embodiments, the aqueous acid solution is concentrated sulfuric acid, i.e. >95 wt % sulfuric acid.

In some embodiments, the carbon dioxide feed gas comprising $SO_2$ does not also comprise $NO_x$. An example of such an embodiment is where the carbon dioxide gas is flue gas from a combustion process where $NO_x$ has already been removed, for example by a deNOx step, after suitable pressure and/or temperature adjustment. However, in preferred embodiments, the carbon dioxide feed gas comprising $SO_2$ as a contaminant, comprises $NO_x$ as a further contaminant. In these embodiments, $SO_2$ and NO are converted to $SO_3$ and $NO_2$ respectively, and the method additionally produces nitric acid for separation with sulfuric acid from the $SO_2$-depleted carbon dioxide gas which is also $NO_x$-lean.

NO is converted to nitric acid in the presence of $O_2$ and water to nitric acid by the following series of reactions:

$$2NO+O_2 \leftrightarrow 2NO_2 \qquad \text{(iii)}$$

$$2NO_2+H_2O \leftrightarrow HNO_2+HNO_3 \qquad \text{(iv)}$$

$$3HNO_2 \leftrightarrow HNO_3+2NO+H_2O \qquad \text{(v)}$$

$NO_2$ also oxidizes $SO_2$ non-catalytically to form $SO_3$ according to the following formula:

$$NO_2+SO_2 \leftrightarrow NO+SO_3 \qquad \text{(vi)}$$

Reactions (ii) to (vi) are referred to herein as the "sour compression" reactions. Following extensive studies (Counce, R. M. (1977), "*A literature review of nitrogen oxide absorption into water and dilute nitric acid*", Technical Report ORNL/TM-5921, Oak Ridge National Laboratory), it has been determined that the rate of reaction (i) is increased as the reaction pressure increases. The Inventors realized that carrying out the present method at elevated pressure improves the rate of reaction (i). In particular, the elevated pressure in these embodiments is preferably at least about 3 bar, which the Inventors have determined is the pressure threshold at which the rate of reaction (i) becomes commercially more useful.

Further details of the sour compression reactions and of suitable sour compression reactor systems are provided in US 2007/0122328 A1, the disclosure of which is incorporated herein by reference.

In preferred embodiments of the present invention, the method comprises maintaining the $SO_3$-enriched carbon dioxide gas comprising $NO_x$ at elevated pressure(s), and preferably at said reduced temperature, in the presence of $O_2$ and water for a period of time sufficient to convert $NO_x$ to nitric acid. The elevated pressure(s) for the sour compression reactions is preferably at least about 3 bar (0.3 MPa), e.g. at least about 5 bar (0.5 MPa). The elevated pressure(s) is usually no more than 100 bar (10 MPa), and preferably no more than 50 bar (5 MPa). In preferred embodiments, the elevated pressure (s) is from about 5 bar to about 50 bar (0.5 MPa to 5 MPa).

The Inventors have realised that the presence of the $NO_x$ in the carbon dioxide gas comprising $SO_2$, assists in the conversion of $SO_2$ to $SO_3$, thereby enabling the simultaneous production of sulfuric acid by two different mechanisms, i.e. (a) by the heterogeneous catalytic reaction (i) followed by reaction (ii), and (b) by the non-heterogeneous catalytic reaction (vi) followed by reaction (ii). In this way, not only is the overall rate of conversion of $SO_2$ to $SO_3$ greater in these embodiments of the present invention than in conventional processes which rely solely on heterogeneous catalytic reaction (i) to oxidise $SO_2$ to $SO_3$ (e.g. the SNOX™ process), but also the heterogeneous oxidation catalyst requirement in the present invention is greatly reduced to that in those conventional processes.

In preferred embodiments of the invention, the feed gas is contacted with the catalyst in a catalytic reactor at a volumetric hourly space velocity from about 5,000 to about 500,000 $Nm^3_{feed}/h/m^3_{catalyst\ bed}$, e.g. from 10,000 to 200,000 $Nm^3_{feed}/h/m^3_{catalyst\ bed}$.

At preferred elevated temperatures, $NO_x$ will be converted in the gas phase in the presence of $O_2$ and water in accordance with reaction (iii) to (v) to produce nitric acid in gaseous or aerosol form depending on the temperature. Therefore, in some embodiments, nitric acid may be separated, together with sulfuric acid, from $SO_2$-depleted, $NO_x$-lean carbon dioxide gas without first cooling the gas mixture to or below the acid dew point under the particular conditions at hand. However, since the acids in these embodiments are either gaseous or in aerosol form, these embodiments may not be preferred.

In preferred embodiments, the method comprises cooling the $SO_3$-enriched carbon dioxide gas comprising $NO_x$, to a reduced temperature that is less than the elevated temperature and no more than the acid dew point at the elevated pressure, thereby condensing a mixture of nitric and sulfuric acids, usually in the form of an aqueous mixed acid solution. Typically, the $SO_3$-enriched carbon dioxide gas comprising $NO_x$ is cooled to a reduced temperature of no more than 300° C. and, usually, to a reduced temperature from ambient temperature to about 275° C. The mixture of nitric and sulfuric acids may then be separated from the $SO_2$-depleted, $NO_x$-lean carbon dioxide gas, or from a $SO_2$-depleted, $NO_x$-lean carbon dioxide gas derived therefrom, in the form of the condensed liquid using conventional methods for separating gas and liquid phases.

The mixed acid condensate may be removed from the system, pumped and cooled by indirect heat exchange against a coolant before being recycled to the system to help cool the $SO_3$-enriched carbon dioxide gas and produce more acid condensate.

Where the feed gas is flue gas from an oxyfuel combustion process and the acids are produced in the form of an aqueous mixed acid solution, the nitric acid is typically more dilute that the sulfuric acid since the $SO_2$:$NO_x$ ratio in the gas is >1. The concentration of nitric acid may be from about 10 wt % to about 100 wt %.

Residence time in a reactor system (i.e. contact time or "hold up" time) determines the degree or extent of the sour compression reactions. In this connection, the period of time required for converting $NO_x$ to nitric acid is typically longer than that required for converting $SO_2$ to sulfuric acid. This period of time is usually more than 5 s, e.g. more than about 10 s or more than about 20 s. The period of time is usually no more than 1000 s, and preferably no more than 600 s. In view of the presence of the $SO_2$ oxidation catalyst, the period of time required is typically significantly less than 600 s, e.g. no more than about 200 s, and preferably no more than about 100 s. For example, the period of time may be from 5 to about 600 s, e.g. from about 10 to about 200 s.

Where the carbon dioxide gas comprising $SO_2$ as a contaminant, also comprises $NO_x$ as a further contaminant, the method typically removes at least 40%, e.g. at least about 60% and, in some embodiments, at least about 90%, of the $NO_x$ contaminant. Preferably, the method removes at least the bulk of the $NO_x$ contaminant, e.g. from 40% to about 99.9%, and, in some preferred embodiments, from about 60% to about 95%.

Where the method is integrated with an oxyfuel combustion process using coal as fuel, mercury will typically be present in the carbon dioxide gas as a further contaminant (based on typical coal compositions). A further advantage of these embodiments of the present invention is that any elemental mercury or mercury compounds present as further contaminant(s) in the carbon dioxide gas will also be removed, since elemental mercury in the vapor phase will be converted to mercuric nitrate and mercury compounds react readily with nitric acid. Typical nitric acid concentrations in these embodiments of the process will be sufficient to remove all of the mercury from the carbon dioxide gas, either by reaction or dissolution.

In some embodiments, the $SO_2$ oxidation catalyst has no effect on the oxidation of NO to $NO_2$. However, in preferred embodiments, the $SO_2$ oxidation catalyst also oxidizes NO to $NO_2$, thereby further promoting the non-heterogeneous catalytic reactions (iii) to (vi).

The $SO_2$-oxidation catalyst is preferably selected from the group consisting of activated carbon; and oxides of transition metals including vanadium, copper, chromium, manganese, iron and platinum. Vanadium pentoxide is particularly preferred.

In embodiments where the catalyst is activated carbon, the catalyst is preferably in the form of corrugated sheets of activated carbon fiber board. In embodiments where the catalyst is a transition metal oxide, the catalyst is typically supported on an inert support, e.g. silica. In some embodiments, the supported catalyst comprises an alkali metal promoter such as potassium or cesium. The supported catalyst is typically either in a "loose" form, such as pellets, or plain or shaped rings, or in the form of a structured catalyst, such as a ceramic monolith.

Particularly preferred catalysts are the transition metal oxide catalysts disclosed in U.S. Pat. No. 4,781,902, the disclosure of which is incorporated herein by reference. These catalysts are the VK series of catalysts developed by Haldor Topsøe A/S. Details of the VK catalysts are summarized in Table 2.

TABLE 2

|  | VK38 | VK48 | VK58 | VK69 | VK-WSA |
|---|---|---|---|---|---|
| Shapes | 6 mm pellets<br>10 mm rings<br>12 mm daisy<br>20 mm rings | 6 mm pellets<br>10 mm rings<br>12 mm daisy | 6 mm pellets<br>10 mm rings<br>12 mm daisy<br>14 mm rings | 9 mm daisy | 6 mm pellets<br>10 mm rings<br>20 mm rings |
| $V_2O_5$ content | 6-8 wt % | 7-9 wt % | 6-8 wt % | — | 6-8 wt % |
| Alkali metal oxide | 11-15 wt %<br>(potassium) | 11-15 wt %<br>(potassium) | 20-25 wt %<br>(cesium) | (cesium) | 11-15 wt %<br>(potassium) |
| Operating temperature | 400-630° C. | 400-550° C. | 370-450° C. | — | 400-550° C. |

One catalyst may be used alone (e.g. vanadium pentoxide or VK38) or more than one catalyst may be used in combination according to the properties of the individual catalysts.

As mentioned above, the carbon dioxide feed gas comprising $SO_2$ as a contaminant is preferably flue gas produced by oxyfuel combustion of a fuel selected from the group consisting of hydrocarbon fuels and carbonaceous fuels. However, the Inventors have realized that the method may be used in conjunction with existing FGD processes, for example as a retro-fit to the outlet of such processes. In this connection, the carbon dioxide feed gas may be derived from flue gas produced by combustion of a fuel selected from the group consisting of hydrocarbon fuels and carbonaceous fuels, in which the flue gas is pre-treated in a desulfurization process to remove a portion of the $SO_2$ from the flue gas to produce the carbon dioxide feed gas for the method. In such embodiments, sulfuric acid, typically in the form of an aqueous (mixed) acid solution, may be recycled to the desulfurization process after suitable adjustment of the pressure and temperature as required.

In some embodiments, the carbon dioxide feed gas comprising $SO_2$ as a contaminant may already be at the elevated pressure, e.g. flue gas from a pressurized oxyfuel combustion system. However, in most embodiments, the carbon dioxide gas is compressed to produce the carbon dioxide feed gas at said elevated pressure. The gas may be compressed in a single stage or in more than one stages, with or without interstage cooling using heat exchangers. If the gas is compressed in multiple stages, then intercooling is typically minimal, or even eliminated entirely, since the method requires $SO_2$ oxidation at elevated temperature. If intercooling is used, then means (such as "knockout" pots) may be used to capture any condensate formed during the compression stages.

In preferred embodiments, heat of compression (generated when the carbon dioxide gas is compressed to the elevated pressure) alone is sufficient to produce the feed gas at the elevated temperature. However, in embodiments where heat of compression alone is not sufficient, the method comprises heating the feed gas at the elevated pressure by indirect heat exchange with a heat transfer fluid to produce said carbon dioxide feed gas at the elevated temperature.

In a particularly preferred embodiment, there is provided a method for removing $SO_2$ and $NO_x$ from carbon dioxide feed gas comprising $SO_2$ and $NO_x$ as contaminants. The method comprises contacting the carbon dioxide feed gas at an elevated temperature and an elevated pressure with a catalyst for oxidizing $SO_2$, in the presence of $O_2$ to convert $SO_2$ to $SO_3$, and produce $SO_3$-enriched carbon dioxide gas comprising $NO_x$. The $SO_3$-enriched carbon dioxide gas comprising $NO_x$ is cooled to a reduced temperature that is less than the elevated temperature and no more that the acid dew point at the elevated pressure. The gas is maintained at the reduced temperature and elevated pressure(s) in the presence of $O_2$ and water for a period of time sufficient to convert $NO_x$ to nitric acid, thereby producing $SO_2$-depleted, $NO_x$-lean carbon dioxide gas and an aqueous mixed acid solution comprising sulfuric and nitric acids. The aqueous mixed acid solution is separated from said $SO_2$-depleted, $NO_x$-lean carbon dioxide gas, or from a $SO_2$-depleted, $NO_x$-lean carbon dioxide gas derived therefrom.

One of the advantages of preferred embodiments of the present invention is that the method works with concentrations of $NO_x$ as low as about 100 ppm. The concentration of $NO_x$ in the carbon dioxide feed gas may be from about 100 ppm to about 10,000 ppm. In embodiments where the carbon dioxide feed gas does not comprise $NO_x$ as a contaminant, the method may further comprise adding to the carbon dioxide gas at least a minimum amount of $NO_x$ required to provide significant assistance in converting $SO_2$ to sulfuric acid. In those embodiments, the amount of $NO_x$ added may be from about 100 ppm to about 10,000 ppm.

An additional advantage of the embodiments of the present invention removing $SO_2$ and $NO_x$ from carbon dioxide gas, is that overall reactor volume, relative to the oxyfuel sour compression process described in US 2007/0122328 A1, is reduced.

A further advantage of the embodiments of the present invention removing $SO_2$ and $NO_x$ from carbon dioxide gas, is that the amount (or volume), relative to the oxyfuel sour compression process described in US 2007/0122328 A1, of aqueous mixed acid solution produced by the method could be reduced depending on the extent to which water needs to be added to enable acid formation.

The aqueous (mixed) acid solution produced by the method may be used in other commercial processes, e.g. in the production of gypsum (calcium sulfate dihydrate or $CaSO_4.2H_2O$) from limestone (calcium carbonate or $CaCO_3$). The more concentrated the aqueous (mixed) acid solution, the more likely the solution would find beneficial commercial uses. In this connection, a further advantage of the present invention over the prior art is that the concentration of aqueous (mixed) acid solution may be varied as desired by controlling the amount of water added to the $SO_3$-enriched carbon dioxide gas.

Production of aqueous acid solution by a condensation process usually results in the formation of acid mist which can be removed by passing the $SO_2$-depleted ($NO_x$-lean) carbon dioxide gas at elevated pressure through at least one fiber bed mist eliminator.

At least a portion of the $SO_2$-depleted ($N_x$-lean) carbon dioxide gas produced by the present invention may be further processed. In preferred embodiments in which the gas comprises water vapor and "non-condensable" gases such as $N_2$, $O_2$ and Ar, the $SO_x$-depleted ($N_x$-lean) carbon dioxide gas is usually dried, purified to remove "non-condensable" components, and compressed to a pipeline pressure from about 80 bar to about 250 bar The gas may then be stored in geological formations or in deep sea locations, or may be used in EOR processes.

The $SO_2$-depleted ($NO_x$-lean) carbon dioxide gas may be dried in a desiccant drier and then cooled to a temperature close to its triple point where "non-condensable" components such as $N_2$, $O_2$ and Ar are removed as gases in a vent stream. This process allows the $CO_2$ loss with the vent stream to be minimized by fixing the feed gas pressure at an appropriate level, e.g. from about 20 bar to about 40 bar (2 MPa to 4 MPa).

Suitable "non-condensable" components removal processes for use with the present invention are described in "*Oxyfuel conversion of heaters and boilers for $CO_2$ capture*" (Wilkinson et al., Second National Conference on Carbon Sequestration; May 5-8, 2003; Washington D.C.); US 2008/0173584 A1; US 2008/0173585 A1; and US 2008/0176174 A1, the disclosure of each of which is incorporated herein by reference. If the present method is used to remove $SO_2$ and $NO_x$ from flue gas produced in an oxyfuel combustion process and is integrated with one of these "non-condensable" components removal methods, then the integrated process typically leads to $CO_2$ purities of 95% to 99.99%, and to $CO_2$ recoveries of 90% to 99%.

The apparatus comprises a compressor arrangement for elevating the pressure of the carbon dioxide feed gas comprising $SO_2$ as a contaminant; and a catalytic reactor system comprising a catalyst for oxidizing $SO_2$, the reactor system being suitable for contacting the carbon dioxide feed gas at an elevated temperature and an elevated pressure with the catalyst in the presence of $O_2$ to convert $SO_2$ to $SO_3$ and produce $SO_3$-enriched carbon dioxide gas; together with a conduit arrangement for feeding the carbon dioxide feed gas at the elevated pressure from the compressor arrangement to the catalytic reactor system. The apparatus also comprises a separator system for contacting the $SO_3$ in the $SO_3$-enriched carbon dioxide gas with water to produce sulfuric acid and $SO_2$-depleted carbon dioxide gas, and for separating the sulfuric acid from the $SO_2$-depleted carbon dioxide gas, or from a $SO_2$-depleted carbon dioxide gas derived therefrom; and a conduit arrangement for feeding $SO_3$-enriched carbon dioxide gas from the catalytic reactor system to the separator system.

The compressor arrangement may involve a single or multiple stages. If the compressor arrangement involves multiple stages, it may further comprise a heat exchanger (or intercooler) for cooling the gas at each interstage by indirect heat exchange against a coolant. If multistage compression intercoolers are present, then an arrangement (e.g. "knockout" pots) should be provided to capture and remove any condensate that may form during the cooling. However, since the method is to operate at an elevated temperature, preferred embodiments of the apparatus may be without such compression intercoolers.

Pressure drop through the catalytic reactor system is not a constraint in the present invention (as it is typically for catalytic reactors operating at or near atmospheric pressure as in the SNOX™ process) since the carbon dioxide gas is already at an elevated pressure suitable for subsequent $CO_2$ capture and, thus, a broader range of reactor designs (e.g. packed bed) can be contemplated. In preferred embodiments, the catalytic reactor system comprises a packed bed of catalyst, or catalyst deposited on the surface of a structured support, e.g. a ceramic monolith.

In preferred embodiments, the separator system may be operated at the same elevated pressure as the catalytic reactor system, subject to any inherent pressure drop between the two systems. However, in embodiments in which the separator system is intended to operate at a different elevated pressure to the catalytic reactor system, the apparatus further comprises a pressure adjustment arrangement, e.g. an expander or a compressor, in the conduit arrangement from the catalytic reactor system to the separator system, to adjust the pressure of the $SO_3$-enriched carbon dioxide gas as required.

The separator system may comprise at least one countercurrent gas/liquid contact device for washing the $SO_3$-enriched carbon dioxide gas with water. The contact device may comprise a first inlet for feeding $SO_3$-enriched carbon dioxide gas into the contact device; a first outlet for removing $SO_2$-depleted carbon dioxide gas from said contact device; a second inlet for feeding water from an external source into said contact device; and a second outlet for removing sulfuric acid from the contact device in the form of an aqueous acid solution.

Where the contact device is a mass/heat transfer separation column (e.g. a "scrub" tower or "spray" tower), aqueous (mixed) acid solution is usually recycled to the top of the column or tower. The recycled portion of the aqueous solution is usually pumped to a higher pressure to produce a pumped solution which is then cooled before recycling.

Additionally or alternatively, the separator system may comprise at least one acid condenser for cooling and condensing sulfuric acid by indirect heat exchange with a coolant. The condenser may have a shell-and-tube type structure with a tube-side for the $SO_3$-enriched carbon dioxide gas and a shell-side for the coolant. The acid condenser may comprise a first inlet for feeding $SO_3$-enriched carbon dioxide gas to the tube side of the condenser; a first outlet for removing $SO_2$-depleted carbon dioxide gas from the tube-side of the condenser; a second inlet for feeding coolant to the shell-side of the condenser; a second outlet for removing coolant from the shell-side of the condenser; a third inlet for feeding water from an external source to the tube-side of the condenser; and a third outlet for removing sulfuric acid from the tube-side of the condenser in the form of an aqueous acid solution.

A suitable (mixed) acid condenser may be a WSA condenser. However, since the condensation would take place at elevated pressure, it may be necessary to use a modified WSA-type condenser, designed to operate at the higher pressures.

If the temperature of the gas leaving the compression arrangement is less than the required elevated temperature for any reason (e.g. the apparatus comprises multistage compression intercoolers, or heat of compression alone is not sufficient to reach the required elevated temperature), then the conduit arrangement for feeding carbon dioxide feed gas at an elevated pressure from the compressor arrangement to said catalytic reactor system, may comprise a heat exchanger arrangement for heating the carbon dioxide gas at the elevated pressure to the elevated temperature by indirect heat exchange with a heat transfer fluid, e.g. steam.

In embodiments of the apparatus for removing $NO_x$ in addition to $SO_2$ from carbon dioxide feed gas comprising $NO_x$ as a further contaminant, nitric acid is produced and separated in the separator system with sulfuric acid, usually in the form of an aqueous mixed acid solution, to produce $SO_2$-depleted, $NO_x$-lean carbon dioxide gas. In such embodiments, the separator system maintains the $SO_3$-enriched carbon dioxide comprising $NO_x$ at elevated pressure(s) in the presence of $O_2$ and water for a period of time sufficient to convert $NO_x$ to nitric acid via the sour compression reactions.

The separator system may comprise a reactor system for the sour compression reactions and a convention gas/liquid separation arrangement. Such a reactor system simply provides a sufficient volume for a given flow rate within which the reactions may take place at elevated pressure(s). The reactor system usually comprises at least one pressurizable reactor vessel such as a pipe or duct; a tank; an absorption column; a wet scrubbing tower; fluidized or moving bed; packed tower or column; and a Venturi scrubber. Where the reactor system comprises a countercurrent gas/liquid contact column, acid condensate may be removed from the bottom of the column, pumped, cooled and fed as reflux to the top of the column.

The reactor system may comprise a single pressurizable reactor vessel for operation at a single elevated pressure within the range of suitable pressures. In other embodiments, the reactor system may comprise at least two (same or different) pressurizable reactor vessels for operation at either the same or different elevated pressures.

Where there are at least two reactor vessels for operation at different elevated pressures, a gas compression arrangement may be provided to compress the gaseous effluent from the elevated operating pressure of a first vessel to the elevated operating pressure of a second vessel. The gas compression arrangement may be at least one stage of a multiple stage gas compressor.

In a particularly preferred embodiment, the reactor system of the separator system comprises a first gas/liquid contact column for operation at a first elevated pressure, and a second gas/liquid contact column for operation at a second elevated pressure that is higher than the first elevated pressure. The first and second elevated pressures are typically both within the preferred ranges given above. The first elevated pressure may be from about 10 bar to about 20 bar (1 MPa to 2 MPa) and the second elevated pressure may be from about 25 bar to about 35 bar (2.5 MPa to 3.5 MPa). Where both $SO_2$ and $NO_x$ are present as contaminants in the carbon dioxide gas to be processed in such embodiments, both columns usually produce mixed acid condensate with the first column producing predominantly sulfuric acid condensate and the second column producing predominantly nitric acid condensate.

The apparatus may comprise an expander arrangement for reducing the pressure of an aqueous (mixed) acid solution comprising sulfuric acid (and nitric acid) to produce the aqueous (mixed) acid solution at reduced pressure; a conduit arrangement for feeding the aqueous (mixed) acid solution from the separator system to the expander arrangement; and a conduit arrangement for feeding the aqueous (mixed) acid solution at reduced pressure from the expander to a flue gas desulfurization system.

In preferred embodiments, the apparatus is integrated with an oxyfuel combustion system. In these embodiments, the apparatus may comprise an oxyfuel combustion system for combusting a fuel selected from hydrocarbon fuels and carbonaceous fuels, in the presence of essentially pure oxygen to produce flue gas, a portion of which optionally being recycled to the oxyfuel combustion system; a wash system for washing flue gas with water to produce washed flue gas; a conduit arrangement for feeding flue gas from the oxyfuel combustion system to the wash system; and a conduit arrangement for feeding washed flue gas form the wash system to the compressor arrangement.

Since the proposed invention would substantially reduce the concentration of $SO_2$ in, or even eliminate $SO_2$ from, the flue gas from an oxyfuel combustion process, conventional equipment for FGD processes to remove $SO_2$ can be substantially reduced in size or even eliminated accordingly. In addition, since embodiments of the proposed invention would substantially reduce the concentration of $NO_x$ in the flue gas from such a process, conventional equipment for an SCR (e.g. a $deNO_x$ system) to remove $NO_2$ can also be substantially reduced or even eliminated.

The apparatus may further comprise a drier arrangement to dry the $SO_x$-depleted ($NO_x$-lean) carbon dioxide gas and produce dried $SO_2$-depleted ($NO_x$-lean) carbon dioxide gas; and a "non-condensable" components separation system to remove "non-condensable" components such as $O_2$, $N_2$ and Ar from the dried gas. Suitable combinations of a drier arrangement and a "non-condensable" components separation system are disclosed in US 2008/0173584 A1; US 2008/0173585 A1; and US 2008/0176174 A1.

Aspects of the invention include:

1. A method for removing $SO_2$ from a carbon dioxide feed gas comprising $SO_2$ as a contaminant, said method comprising:

contacting said carbon dioxide feed gas at an elevated temperature and an elevated pressure with a catalyst for oxidizing $SO_2$, in the presence of $O_2$ to convert $SO_2$ to $SO_3$ and produce an $SO_3$-enriched carbon dioxide gas; and contacting $SO_3$ in said $SO_3$-enriched carbon dioxide gas with water to produce sulfuric acid and a $SO_2$-depleted carbon dioxide gas; and separating said sulfuric acid from said $SO_2$-depleted carbon dioxide gas, or from a $SO_2$-depleted carbon dioxide gas derived therefrom.

2. A method according to #1, wherein the elevated pressure is at least about 2 bar (0.2 MPa).

3. A method according to #1 or #2, wherein the elevated pressure is no more than about 50 bar (5 MPa).

4. A method according to any of #1 to #3, wherein the elevated temperature is at least 300° C.

5. A method according to any of #1 to #4, wherein the elevated temperature is no more than about 700° C.

6. A method according to any of #1 to #5, wherein said carbon dioxide feed gas comprises $NO_x$ as a further contaminant, said method additionally producing nitric acid for separation with said sulfuric acid from said $SO_2$-depleted carbon dioxide gas which is also $NO_x$-lean, or from said gas derived therefrom.

7. A method according to any of #1 to #6, said method comprising cooling said $SO_3$-enriched carbon dioxide gas to a reduced temperature that is less than the elevated temperature and no more that the acid dew point at said elevated pressure, thereby condensing sulfuric acid, wherein said sulfuric acid is separated from said $SO_2$-depleted carbon dioxide gas, or a gas derived therefrom, in the form of a liquid.

8. A method according to #7, wherein said reduced temperature is no more than 300° C.

9. A method according to #7 or #8, wherein said $SO_3$-enriched carbon dioxide gas is cooled by indirect heat exchange against at least one coolant.

10. A method according to any of #7 to #9, wherein said $SO_3$-enriched carbon dioxide gas is cooled by direct heat exchange with water from an external source.

11. A method according to any of #7 to #10, wherein said carbon dioxide feed gas comprises $NO_x$ as a further contaminant, said method additionally producing nitric acid for separation with said sulfuric acid from said $SO_2$-depleted carbon dioxide gas which is also $NO_x$-lean, or from said gas derived therefrom.

12. A method according to #11, said method comprising maintaining said $SO_3$-enriched carbon dioxide gas comprising $NO_x$ at said elevated pressure in the presence of $O_2$ and water for a period of time sufficient to convert $NO_x$ to nitric acid.

13. A method according to #12, wherein said period of time is no more than 600 seconds.

14. A method according to any of #11 to #13, wherein said catalyst also oxidizes nitric oxide (NO) to $NO_2$.

15. A method according to any of #1 to #14, wherein said carbon dioxide feed gas is contacted with said catalyst in a catalytic reactor at an volumetric hourly space velocity from about 5,000 to about 500,000 $Nm^3_{feed}/h/m^3_{catalyst\ bed}$.

16. A method according to any of #1 to #15, comprising compressing carbon dioxide gas comprising $SO_2$ as a contaminant to produce said carbon dioxide feed gas at said elevated pressure, wherein heat of compression alone is sufficient to produce said carbon dioxide feed gas at said elevated temperature.

17. A method according to any of #1 to #16, comprising:

compressing carbon dioxide gas comprising $SO_2$ as a contaminant to produce said carbon dioxide feed gas at said elevated pressure; and heating said carbon dioxide feed gas at said elevated pressure by indirect heat exchange with a heat transfer fluid to produce said carbon dioxide feed gas at said elevated temperature.

18. A method according to any of #1 to #17, wherein said carbon dioxide feed gas is, or is derived from, flue gas produced by oxyfuel combustion of a fuel selected from the group consisting of hydrocarbon fuels and carbonaceous fuels.

19. A method according to #18, wherein said flue gas is pre-treated in a desulfurization process to remove a portion of the $SO_2$ from the flue gas.

20. A method according to #19, wherein said sulfuric acid is recycled to the desulfurization process after suitable adjustment of the pressure and temperature as required.

21. A method for removing $SO_2$ and $NO_x$ from carbon dioxide feed gas comprising $SO_2$ and $NO_x$ as contaminants, said method comprising:
  contacting said carbon dioxide feed gas at an elevated temperature and an elevated pressure with a catalyst for oxidizing $SO_2$, in the presence of $O_2$ to convert $SO_2$ to $SO_3$ and produce $SO_3$-enriched carbon dioxide gas comprising $NO_x$;
  cooling said $SO_3$-enriched carbon dioxide gas comprising $NO_x$ to a reduced temperature that is less than the elevated temperature and no more that the acid dew point at said elevated pressure, wherein said gas is maintained at said reduced temperature and elevated pressure(s) in the presence of $O_2$ and water for a period of time sufficient to convert $NO_x$ to nitric acid, thereby producing $SO_2$-depleted, $NO_x$-lean carbon dioxide gas and an aqueous mixed acid solution comprising sulfuric and nitric acids; and
  separating said aqueous mixed acid solution from said $SO_2$-depleted, $NO_x$-lean carbon dioxide gas, or from a $SO_2$-depleted, $NO_x$-lean carbon dioxide gas derived therefrom.

22. Apparatus for removing $SO_2$ from carbon dioxide feed gas comprising $SO_2$ as a contaminant, said apparatus comprising:
  a compressor arrangement for elevating the pressure of carbon dioxide feed gas comprising $SO_2$ as a contaminant;
  a catalytic reactor system comprising a catalyst for oxidizing $SO_2$, said reactor system being suitable for contacting carbon dioxide feed gas at an elevated temperature and an elevated pressure with said catalyst in the presence of $O_2$ to convert $SO_2$ to $SO_3$ and produce $SO_3$-enriched carbon dioxide gas;
  a conduit arrangement for feeding carbon dioxide feed gas at an elevated pressure from said compressor arrangement to said catalytic reactor system;
  a separator system for contacting $SO_3$ in said $SO_3$-enriched carbon dioxide gas with water to produce sulfuric acid and $SO_2$-depleted carbon dioxide gas, and for separating said sulfuric acid from said $SO_2$-depleted carbon dioxide gas, or from a $SO_2$-depleted carbon dioxide gas derived therefrom; and
  a conduit arrangement for feeding $SO_3$-enriched carbon dioxide gas from said catalytic reactor system to said separator system.

23. An apparatus according to #22 for removing $NO_x$ in addition to $SO_2$ from said carbon dioxide feed gas comprising $NO_x$ as a further contaminant, wherein nitric acid is produced and separated in the separator system with sulfuric acid to produce $SO_2$-depleted, $NO_x$-lean carbon dioxide gas.

24. An apparatus according to #23, wherein said separator system maintains $SO_3$-enriched carbon dioxide comprising $NO_x$ at said elevated pressure in the presence of $O_2$ and water for a period of time sufficient to convert $NO_x$ to nitric acid.

25. An apparatus according to any of #22 to #24 comprising
  an expander arrangement for reducing the pressure of an aqueous acid solution comprising said sulfuric acid to produce said aqueous acid solution at reduced pressure;
  a conduit arrangement for feeding said aqueous acid solution from said separator system to said expander arrangement; and
  a conduit arrangement for feeding said aqueous acid solution at reduced pressure from said expander to a flue gas desulfurization system.

Figure 1:
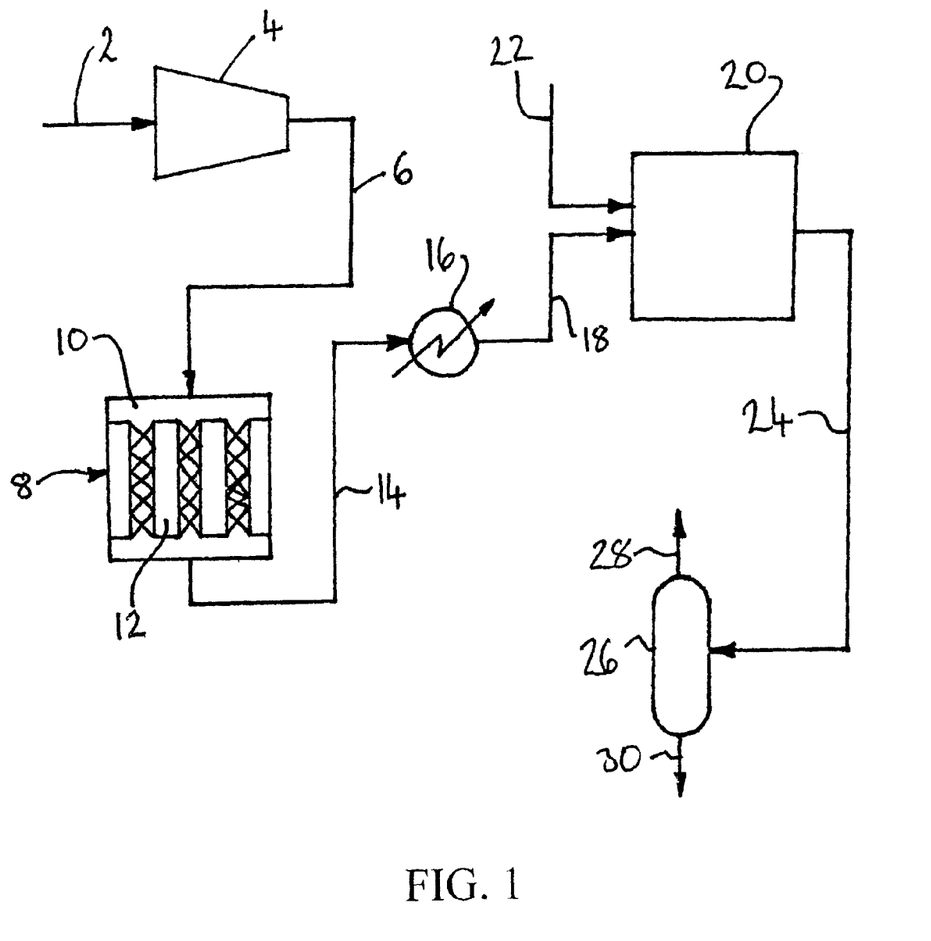
FIG. 1 is a flow sheet depicting one embodiment of the present invention.

Referring to FIG. 1, a stream 2 of flue gas (comprising about 83% $CO_2$ and $SO_2$, $NO_x$ and $O_2$ as contaminants) from an oxyfuel combustor system (not shown) at a temperature of about 170° C. is compressed in a compressor 4 to produce a stream 6 of compressed flue gas at an elevated pressure of about 10 bar (1 MPa). The compressor 4 has at least two compression stages and raises the temperature of the flue gas during compression to an elevated temperature of about 450° C.

Stream 6 is fed to a catalytic reactor system 8 comprising a first pressurized reactor vessel 10 and a packed bed 12 of vanadium pentoxide-based catalyst. The specific catalyst used in this example is VK38 (12 mm daisy) manufactured by Haldor Topsøe A/S. In reactor system 8, $SO_2$ is converted to $SO_3$ by catalytic oxidation of $SO_2$ with $O_2$.

A stream 14 of $SO_3$-enriched carbon dioxide gas comprising $NO_x$ is removed from the reactor system 8 and fed to a cooler 16 where it is cooled to about 20° C. by indirect heat exchange against a coolant, e.g. cooling water, to produce a cooled stream 18 of $SO_3$-enriched carbon dioxide gas comprising $NO_x$. Stream 18 is then fed to a separation system which includes a second pressurized reactor vessel 20 and a pressurized gas/liquid separator 26.

The $SO_3$-enriched carbon dioxide gas comprising $NO_x$ is maintained in reactor vessel 20 at the elevated pressure in the presence of oxygen and water for a period of time sufficient to not only convert $NO_x$ to nitric acid but also $SO_3$ and residual $SO_2$ to sulfuric acid, by the sour compression reactions (ii) to (vi) mentioned above. A stream 22 of water from an external source may be added to the reactor vessel 20 during this step to facilitate production of an aqueous mixed acid solution of nitric and sulfuric acids.

A stream 24 comprising $SO_2$-depleted, $NO_x$-lean carbon dioxide gas and the aqueous mixed acid solution is fed to the gas/liquid separator 26 and separated to produce a stream 28 of $SO_2$-depleted, $NO_x$-lean carbon dioxide gas and a stream 30 of the aqueous mixed acid solution. Stream 28 may be fed to a drier arrangement and "non-condensable" gases separation train of a $CO_2$ recovery and purification system (not shown). Stream 30 may be fed to a process (not shown) for producing gypsum from limestone.

Reactor vessel 20 and gas/liquid separator 26 are depicted in FIG. 1 as separate components of the separator system. However, it should be noted that depicting these components in this way should not be interpreted as meaning that these components must be separate. Some embodiments of the invention may indeed have a gas/liquid separator 26 that is separate from the reactor vessel 20. However, in other embodiments, the separating of gas and liquid takes place in the reactor vessel 20 itself, in which case streams 28 and 30 are taken directly from the reactor vessel 20. Such an embodiment is depicted in FIG. 2.

Figure 3:
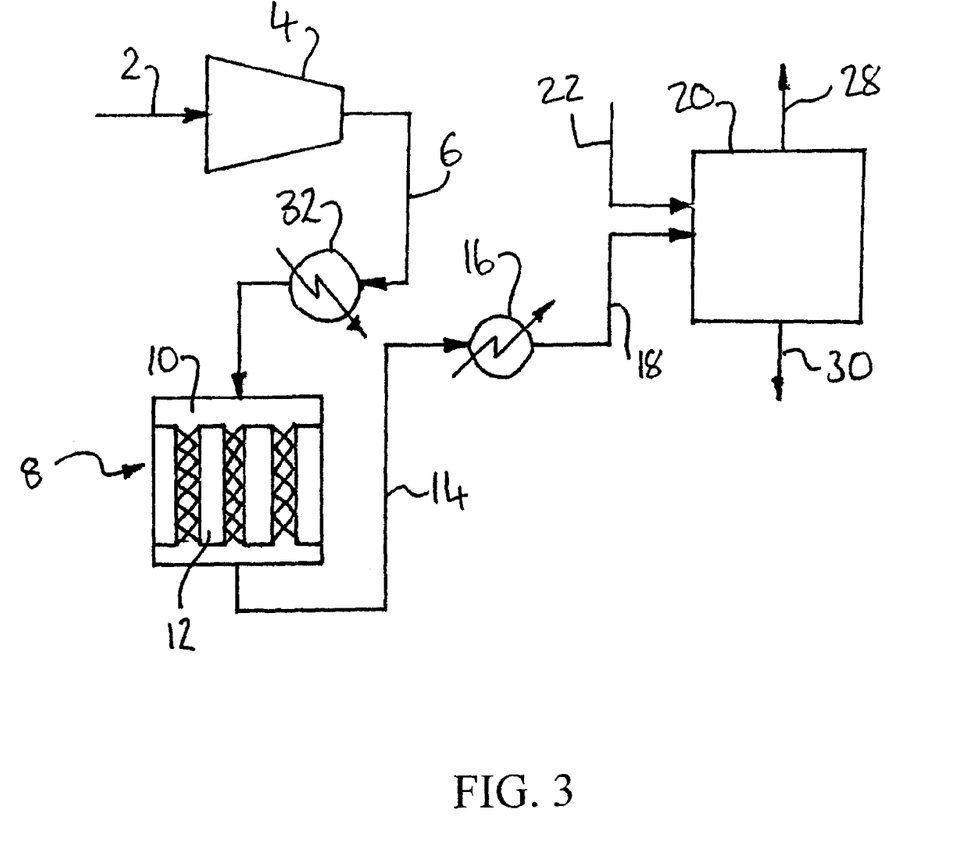
FIG. 3 is a flow sheet depicted a third embodiment of the present invention.

If the heat of compression alone is not sufficient to raise the temperature of stream 2 to the required elevated temperature, a heat exchanger 32 may be used to heat stream 6 by indirect heat exchange using a heat transfer fluid, e.g. steam. Such an embodiment is depicted in FIG. 3. In one example of this embodiment, the temperature of stream 2 is ambient (~25° C.). Heat of compression from compressor 4 raises the temperature of the gas such that stream 6 is at a temperature of about 247° C. Heat exchanger 32 raises the temperature of the gas at the elevated pressure to the elevated temperature, e.g. 450° C.

Figure 2:
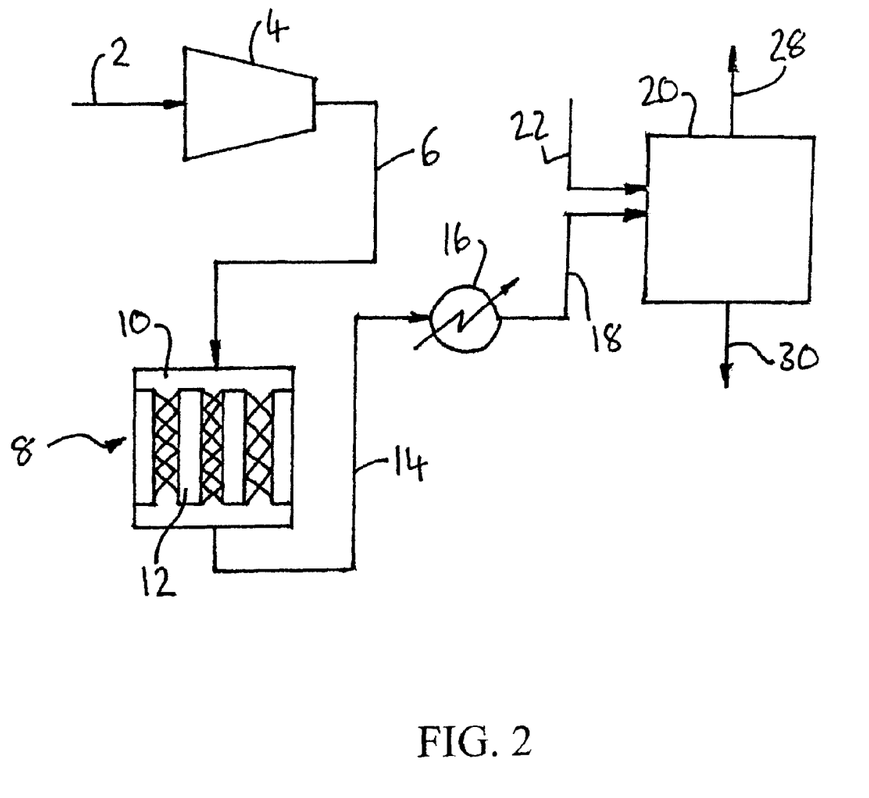
FIG. 2 is a flow sheet depicting a second embodiment of the present invention.

The features that are common between FIG. 1 and FIGS. 2 and 3 have been given the same numerical references.

The process depicted in any of FIGS. 1 to 3 may be retrofitted to an existing SNOX™ process. In such an embodiment, stream 2 would be taken from the WSA-condenser (not shown) and the pressure of stream 30 would be reduced in an expander (not shown) and then returned to the WSA-condenser.

EXAMPLE

Computer simulations using the ASPEN™ Plus software (version 2006.5; © Aspen Technology, Inc.) have been carried out to compare the process depicted in FIG. 1 (Cases J through L) with corresponding processes only involving either the catalytic oxidation of $SO_2$ in reactor 8 (Cases A though F) or the non-heterogeneous catalytic conversion of $SO_2$ and $NO_x$ to sulfuric acid and nitric acid respectively in reactor 20 (Cases G through I).

In the simulations, the carbon dioxide feed gas had the following composition: 82.37% $CO_2$, 8.5% $N_2$, 4.5% $O_2$, 2.5% $H_2O$, 2% Ar, 1000 ppm $SO_2$, and 300 ppm NO. The elevated pressure was 10 bar (1 MPa), the elevated temperature was 450° C. and the reduced temperature was 20° C. For the purpose of the simulations, it was assumed that:

the catalytic reaction is $SO_2 + \frac{1}{2}O_2 \rightarrow SO_3$;
there is no conversion of NO to $NO_2$ in the catalytic reactor; and
the catalytic reaction is $1^{st}$ order with respect to $SO_2$ and zero order with respect to $O_2$.

The $1^{st}$ order rate constant for the catalytic $SO_2$ oxidation reaction was estimated from Examples 4 to 7 and Table 2 in U.S. Pat. No. 4,781,902 to be about 3.71 $sec^{-1}$ @450° C.

The results of the various simulations (Cases A through L) are provided in Table 3.

It should be noted that a given residence time at 1 bar represents either a 10× larger reactor or a 10× lower mass flow rate than the same residence time at 10 bar For example, Cases D and F have the same residence time in reactor 8 but Case F has a 10× higher mass flow rate due to the higher pressure.

The results indicate that the combined system (reactors 8 and 20 in combination) provides a higher $SO_2$ conversion rate at the same residence time (compare Case K to Case E or Case H). In addition, it may be observed that the combined system provides the same $SO_2$ conversion at less than ⅓ of the catalyst amount (compare Case K to Case C). Further, the combined system provides the same conversion with a reactor 20 of half the size (compare Case J to Case H).

TABLE 3

| Case | Pressure in bar (MPa) | Residence time in reactor 8 (s) | Volumetric space velocity in reactor 8 ($Nm^3_{feed}$/$h/m^3_{cat.}$) | Residence time in reactor 20 (s) | $SO_2$ conv. (%) | $NO_x$ conv (%) |
|---|---|---|---|---|---|---|
| Reactor 8 only: | | | | | | |
| A | 1 (0.1) | 0.17 | 9378 | N/A | 46.4 | 0.0 |
| B | 1 (0.1) | 0.33 | 4831 | N/A | 71.9 | 0.0 |
| C | 1 (0.1) | 0.67 | 2380 | N/A | 93.2 | 0.0 |
| D | 1 (0.1) | 1.34 | 1190 | N/A | 99.1 | 0.0 |
| E | 10 (1) | 0.16 | 99646 | N/A | 45.9 | 0.0 |
| F | 10 (1) | 1.31 | 12170 | N/A | 99.4 | 0.0 |
| Reactor 20 only: | | | | | | |
| G | 10 (1) | N/A | N/A | 53.9 | 79.0 | 29.9 |
| H | 10 (1) | N/A | N/A | 107.1 | 89.4 | 48.4 |
| I | 10 (1) | N/A | N/A | 532.0 | 98.2 | 81.8 |
| Reactors 8 and 20 | | | | | | |
| J | 10 (1) | 0.10 | 159433 | 54.1 | 88.0 | 41.0 |
| K | 10 (1) | 0.20 | 79717 | 108.1 | 96.5 | 64.9 |
| L | 10 (1) | 1.00 | 15943 | 546.5 | 100.0 | 91.3 |

It will be appreciated that the invention is not restricted to the details described above with reference to the preferred embodiments but that numerous modifications and variations can be made without departing form the spirit or scope of the invention as defined in the following claims.

The invention claimed is:

1. A method for removing sulfur dioxide ($SO_2$) from a carbon dioxide feed gas comprising $SO_2$ as a contaminant, said method comprising:
   contacting said carbon dioxide feed gas at an elevated temperature of at least 375° C. and an elevated pressure with a heterogeneous catalyst for oxidizing $SO_2$, in the presence of oxygen ($O_2$) to convert $SO_2$ to sulfur trioxide ($SO_3$) and produce an $SO_3$-enriched carbon dioxide gas;
   contacting $SO_3$ in said $SO_3$-enriched carbon dioxide gas with water to produce sulfuric acid and a $SO_2$-depleted carbon dioxide gas; and
   separating said sulfuric acid from said $SO_2$-depleted carbon dioxide gas, or from a $SO_2$-depleted carbon dioxide gas derived therefrom.

2. The method of claim 1, wherein the elevated pressure is at least about 2 bar (0.2 MPa).

3. The method of claim 1, wherein the elevated pressure is no more than about 50 bar (5 MPa).

4. The method of claim 1, wherein the elevated temperature is no more than about 700° C.

5. The method of claim 1, wherein said carbon dioxide feed gas comprises $NO_x$ as a further contaminant, said method additionally producing nitric acid for separation with said sulfuric acid from said $SO_2$-depleted carbon dioxide gas which is also $NO_x$-lean, or from said gas derived therefrom.

6. The method of claim 1, said method comprising cooling said $SO_3$-enriched carbon dioxide gas to a reduced temperature that is less than the elevated temperature and no more than the acid dew point at said elevated pressure, thereby condensing sulfuric acid, wherein said sulfuric acid is separated from said $SO_2$-depleted carbon dioxide gas, or said gas derived therefrom, in the form of a liquid.

7. The method of claim 6, wherein said reduced temperature is no more than 300° C.

8. The method of claim 6, wherein said $SO_3$-enriched carbon dioxide gas is cooled by indirect heat exchange against at least one coolant.

9. The method of claim 6, wherein said $SO_3$-enriched carbon dioxide gas is cooled by direct heat exchange with water from an external source.

10. The method of claim 6, wherein said carbon dioxide feed gas comprises $NO_x$ as a further contaminant, said method additionally producing nitric acid for separation with said sulfuric acid from said $SO_2$-depleted carbon dioxide gas which is also $NO_x$-lean, or from said gas derived therefrom.

11. The method of claim 10, said method comprising maintaining said $SO_3$-enriched carbon dioxide gas comprising $NO_x$ at said elevated pressure in the presence of $O_2$ and water for a period of time sufficient to convert $NO_x$ to nitric acid.

12. The method of claim 11, wherein said period of time is no more than 600 seconds.

13. The method of claim 10, wherein said catalyst also oxidizes nitric oxide (NO) to $NO_2$.

14. The method of claim 1, wherein said carbon dioxide feed gas is contacted with said catalyst in a catalytic reactor at an volumetric hourly space velocity from about 5,000 to about 500,000 $Nm^3_{feed}/h/m^3_{catalyst\ bed}$.

15. The method of claim 1, comprising compressing carbon dioxide gas comprising $SO_2$ as a contaminant to produce said carbon dioxide feed gas at said elevated pressure, wherein heat of compression alone is sufficient to produce said carbon dioxide feed gas at said elevated temperature.

16. The method of claim 1, comprising:
compressing carbon dioxide gas comprising $SO_2$ as a contaminant to produce said carbon dioxide feed gas at said elevated pressure; and
heating said carbon dioxide feed gas at said elevated pressure by indirect heat exchange with a heat transfer fluid to produce said carbon dioxide feed gas at said elevated temperature.

17. The method of claim 1, wherein said carbon dioxide feed gas is, or is derived from, flue gas produced by oxyfuel combustion of a fuel selected from the group consisting of hydrocarbon fuels and carbonaceous fuels.

18. The method of claim 17, wherein said flue gas is pretreated in a desulfurization process to remove a portion of the $SO_2$ from the flue gas.

19. The method of claim 18, wherein said sulfuric acid is recycled to the desulfurization process after suitable adjustment of the pressure and temperature as required.

* * * * *

UNITED STATES PATENT AND TRADEMARK OFFICE
CERTIFICATE OF CORRECTION

| | | |
|---|---|---|
| PATENT NO. | : 8,282,901 B2 | Page 1 of 1 |
| APPLICATION NO. | : 12/832096 | |
| DATED | : October 9, 2012 | |
| INVENTOR(S) | : Francis Peter Petrocelli, Kevin Boyle Fogash and Vincent White | |

It is certified that error appears in the above-identified patent and that said Letters Patent is hereby corrected as shown below:

Title Page, Item (54) and Col. 1, Line 1, please change the title from "Integration of Catalytic CO2 Oxidation and Oxyfuel Sour Compression" to "Integration of Catalytic SO2 Oxidation and Oxyfuel Sour Compression".

Signed and Sealed this
Twelfth Day of March, 2013

Teresa Stanek Rea
*Acting Director of the United States Patent and Trademark Office*